United States Patent
Mak (10) Patent No.: US 7,358,960 B2
(45) Date of Patent: Apr. 15, 2008

(54) SYSTEM AND METHOD FOR DISPLAYING TWO-DIMENSIONAL DATA ON SMALL SCREEN DEVICES

(75) Inventor: Mingchi Stephen Mak, Belmont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 445 days.

(21) Appl. No.: 10/285,825

(22) Filed: Oct. 31, 2002

(65) Prior Publication Data

US 2004/0085289 A1   May 6, 2004

(51) Int. Cl.
*G09G 5/00* (2006.01)
(52) U.S. Cl. .................. 345/169; 715/817; 379/201.04
(58) Field of Classification Search ................ 345/661, 345/665, 663, 169, 161, 1.1–1.3; 715/720–723, 715/797, 804, 817–819, 845, 783–791; 379/201.04
See application file for complete search history.

(56) References Cited

U.S. PATENT DOCUMENTS

| 6,230,321 B1 * | 5/2001 | Kim ............................ 725/37 |
| 6,288,718 B1 * | 9/2001 | Laursen et al. ............. 715/800 |
| 6,570,583 B1 * | 5/2003 | Kung et al. ................. 345/661 |
| 6,606,082 B1 * | 8/2003 | Zuberec et al. ............. 345/156 |

* cited by examiner

*Primary Examiner*—Duc Q Dinh
(74) *Attorney, Agent, or Firm*—Martine Penilla & Gencarella, LLP (57) ABSTRACT

An invention is provided for displaying two-dimensional data on small screen devices. The invention includes providing a first data set display section on a screen, which is capable of presenting a list of entries in a first data set. In addition, a second data set display section is provided on the screen. The second data set display section is capable of presenting a particular entry from a second data set associated with a selected entry from the first data set. In operation, a new entry from the second data set is presented in the second data set display section in response to receiving a navigation command related to the second data set. The new entry is associated with the selected entry from the first data set.

20 Claims, 8 Drawing Sheets

| NAME | Work | Mobile | Home |
|---|---|---|---|
| Ted B. | 555-1234 _152a_ | 555-8932 _152b_ | 555-4532 _152c_ |
| Jane Doe | 555-8549 _152a_ | 555-7852 _152b_ | 555-1238 _152c_ |
| Mark T. | 555-9865 _152a_ | 555-4568 _152b_ | 555-7892 _152c_ |
| Jim Smith | 555-2121 _152a_ | 555-6325 _152b_ | 555-4587 _152c_ |

106d → Ted B.
106c → Jane Doe
106b → Mark T.
106a → Jim Smith

SYSTEM AND METHOD FOR DISPLAYING TWO-DIMENSIONAL DATA ON SMALL SCREEN DEVICES

CROSS REFERENCE TO RELATED APPLICATIONS

This application is related to U.S. patent application Ser. No. 10/285,789, filed Oct. 31, 2002, and entitled "System and Method for Presenting Time Related Data on a Small Screen Device," which is incorporated herein be reference.

BACKGROUND OF THE INVENTION

1. Field of the Invention

This invention relates generally to data display on small screen devices, and more particularly to systems and methods for displaying two-dimensional data on small screen devices.

2. Description of the Related Art

Recent advancements in cellular phone technologies have made instant communication easier and faster than ever. Originally analog, cellular systems have evolved to a digital format, which has enabled the cellular phone to become a smart phone having increased data storage capability and access to the Internet. Cellular phone systems generally include numerous base stations, each covering a small geographic area, known as a "cell," that slightly overlaps adjacent cells at the borders. The cells, combined with low power transmitters, provide a communication network for cellular phone users.

The reduced costs and instant communication ability of the cellular phone has resulted in an increased dependents on cellular phones when away from the home, office, and when traveling. Moreover, because of the memory available in most cellular phones, increasingly complex data can be stored in cellular phone memory, such as electronic phonebook data.

Electronic phonebook data is a form of two-dimensional data that commonly is stored on cellular phones. As will be explained in greater detail subsequently, two-dimensional data, as used in the present description, refers to two data sets related to each other, such as in a spreadsheet or phonebook. For example, a phonebook typically includes a list of names. Each name generally has associated therewith a number of data entries, such as telephone number entries and email address entries. For example, a particular name may have a work telephone number and a home telephone number associated with it. A similar relation occurs in other forms of two-dimensional data, such as a spreadsheet. A spreadsheet, for example, generally includes a plurality of rows, each having a plurality of columns associated with the row.

Unfortunately, small screen devices such as cellular phones and personal digital assistants (PDAs) have a limited amount of screen space to display information, generally in the range of about 108×96 pixels. Even when higher resolutions are utilized, the small size of the screen limits the information that can be displayed. For example, at a resolution of 1024×768 pixels, the screen can only display ten rows of lines if the screen is two inches in height. Small screen devices typically can display a single set of data, which generally is displayed using a user interface representation of a list. However, when data is two-dimensional, such as the phonebook described above, a small screen device generally cannot display both data sets on a single screen. As a result, two-dimensional data generally is split into two or more screens of data, as illustrated next with respect to FIGS. 1A and 1B.

Figure 1A:
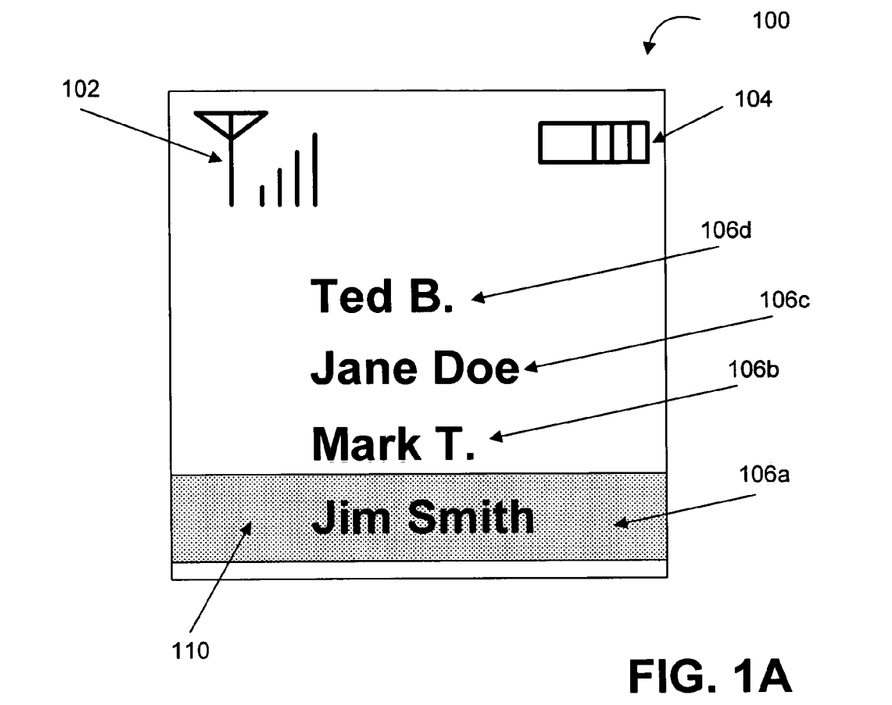
FIG. 1A is a diagram showing a prior art small screen display of a phonebook directory list.

FIG. 1A is a diagram showing a prior art small screen display of a phonebook directory list 100. The exemplary prior art phonebook directory list 100 generally includes a signal strength indicator 102 and a battery power indicator 104 in addition to the phonebook data. The signal strength indicator 102 informs the user as to the signal strength currently available at the user's current location, while the battery power indicator 104 informs the user as to the current power available in cellular phone's battery. The actual phonebook data generally includes a plurality of name entries 106a-106d and a selection indicator 110, which is utilized to select particular names from the plurality of name entries 106a-106d, as described below.

A phonebook generally is ordered by names, with each name having a plurality of data associated with it, such as home phone numbers, work phone numbers, mobile phone numbers, and email addresses. However, as mentioned above, the physically small screen size of small screen devices generally does not allow displaying all the above information simultaneously. Hence, the data is split into various screens. For example, the first screen of an electronic phonebook typically shows a list of names 106a-106d, as illustrated in FIG. 1A. The user can browse through the list of names 106a-106d using the selection indicator 110.

Once the user finds the desired name, the selection indicator 110 is used to select the name entry. For example, in FIG. 1A the user has moved the selection cursor 110 over the name entry 106a "Jim Smith." The user then confirms their selection, typically by pressing an "enter" or "select" button on the phone. Upon receiving the selection, the phone displays a second screen for the data associated with the selected name entry, as illustrated next with reference to FIG. 1B.

Figure 1B:
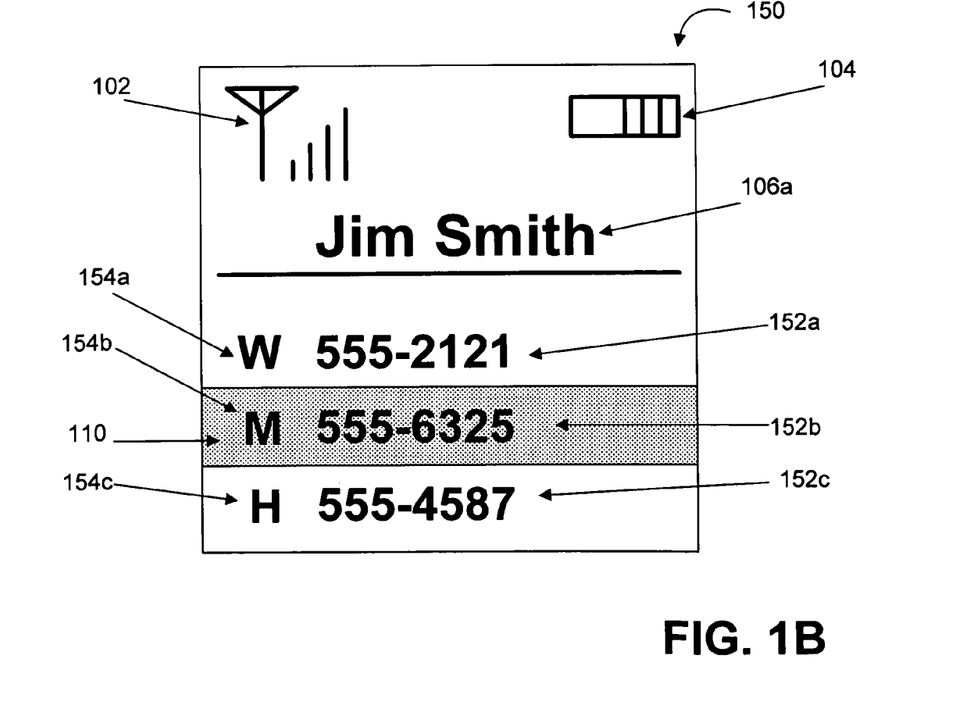
FIG. 1B is a diagram showing a prior art small screen display of secondary data for a phonebook directory.

FIG. 1B is a diagram showing a prior art small screen display of secondary data 150 for a phonebook directory. As above, the exemplary prior art secondary data display 150 generally includes the signal strength indicator 102 and the battery power indicator 104. In addition, a typical secondary data display includes the selected entry of the first data set listed prominently at the top of the display, and a list of related entries from the second data set below the selected first data set entry. For example, in FIG. 1B, the phonebook data includes the selected name entry, in this case "Jim Smith" 106a, listed prominently at the top of the display 150, and a list of entries from the second data set below the selected name entry 106a. In this example, the second data set entries include a list of phone number entries 152a-152c related to the selected name entry "Jim Smith" 106a. Each phone number entry can also include a number type indicator, such as "W" for work 154a, "M" for mobile 154b, and "H" for home 154c. The user can browse through the list of phone numbers 154a-154d using the selection indicator 110.

Once the user finds the desired phone number entry 152a-152d, the selection indicator 110 is used to select the phone number. For example, in FIG. 1B the user has moved the selection cursor 110 over the phone number entry 152b, which is the "mobile" phone number entry for "Jim Smith." The user then confirms their selection, typically by pressing an "enter" or "select" button on the phone. Upon receiving the selection, the phone calls the selected phone number.

As can be appreciated from the above example, the conventional two-dimensional data display used for small screen devices has several problems. First, the user cannot see any phone numbers in the first screen, which generally lists only the name entries for the electronic phonebook. As a result, the user is required to switch screens in order to obtain the required data, in this case the actual phone numbers. Second, the user generally cannot dial the phone number of a person in the first screen. Although some electronic phonebooks allow a default number to be associated with a name entry, the user cannot dial a number from the first data screen if the desired number is not the default number for the selected name entry.

In view of the foregoing, there is a need for a method for displaying a two-dimensional data on small screen devices. In addition, the method should allow easy navigation of both data sets from the same screen.

SUMMARY OF THE INVENTION

Broadly speaking, the present invention fills these needs by providing techniques for displaying a two-dimensional data on small screen devices. In one embodiment, a method is disclosed for displaying two-dimensional data on small screen devices. The method includes providing a first data set display section on a screen, which is capable of presenting a list of entries in a first data set. In addition, a second data set display section is provided on the screen. The second data set display section is capable of presenting a particular entry from a second data set associated with a selected entry from the first data set. In operation, a new entry from the second data set is presented in the second data set display section in response to receiving a navigation command related to the second data set. The new entry is associated with the selected entry from the first data set. For example, the first data set can comprise a plurality of name entries for an electronic phonebook, and the second data set can comprise a plurality of phone numbers and/or email addresses related to the name entries of the first data set. In this manner, a user can browse through both the name entries and the related phone numbers/email addresses for each name entry on the same screen.

A small screen device capable of displaying two-dimensional data on small screen devices is disclosed in an additional embodiment of the present invention. The small screen device includes a screen that has a first data set display section and a second data set display section. The first data set display section is capable of presenting a list of entries in a first data set, and the second data set display section is capable of presenting a particular entry from a second data set associated with a selected entry from the first data set. The small screen device also includes navigation controls capable of providing navigation commands. In operation, a new entry from the second data set is presented in the second data set display section in response to receiving a navigation command related to the second data set. The new entry is associated with the selected entry from the first data set. For example, the navigation controls can include left and right directional keys that provide navigation commands related to the second data set, and up and down directional keys that provide navigation commands related to the first data set. In addition, the navigation controls can include a joystick. For example, left and right joystick movement can provide navigation commands related to the second data set, and up and down joystick movement provides navigation commands related to the first data set.

In a further embodiment, a computer program embodied on a computer readable medium is disclosed for displaying two-dimensional data on small screen devices. The computer program includes program instructions that provide a first data set display section on a screen. The first data set display section is capable of presenting a list of entries in a first data set. The computer program also includes program instructions that provide a second data set display section on the screen. The second data set display section is capable of presenting a particular entry from a second data set associated with a selected entry from the first data set. In addition, program instructions are included that present a new entry from the second data set in the second data set display section in response to receiving a navigation command related to the second data set. As above, the second entry is associated with the selected entry from the first data set. Optionally, program instructions can be included that provide a selection indicator in the first data set display section, which indicates the selected entry from the first data set. In this case, program instructions that move the selection indicator among entries in the first data set in response to receiving a navigation command related to the first data set can also be included. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a method for displaying a two-dimensional related data set on small screen devices. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 2:
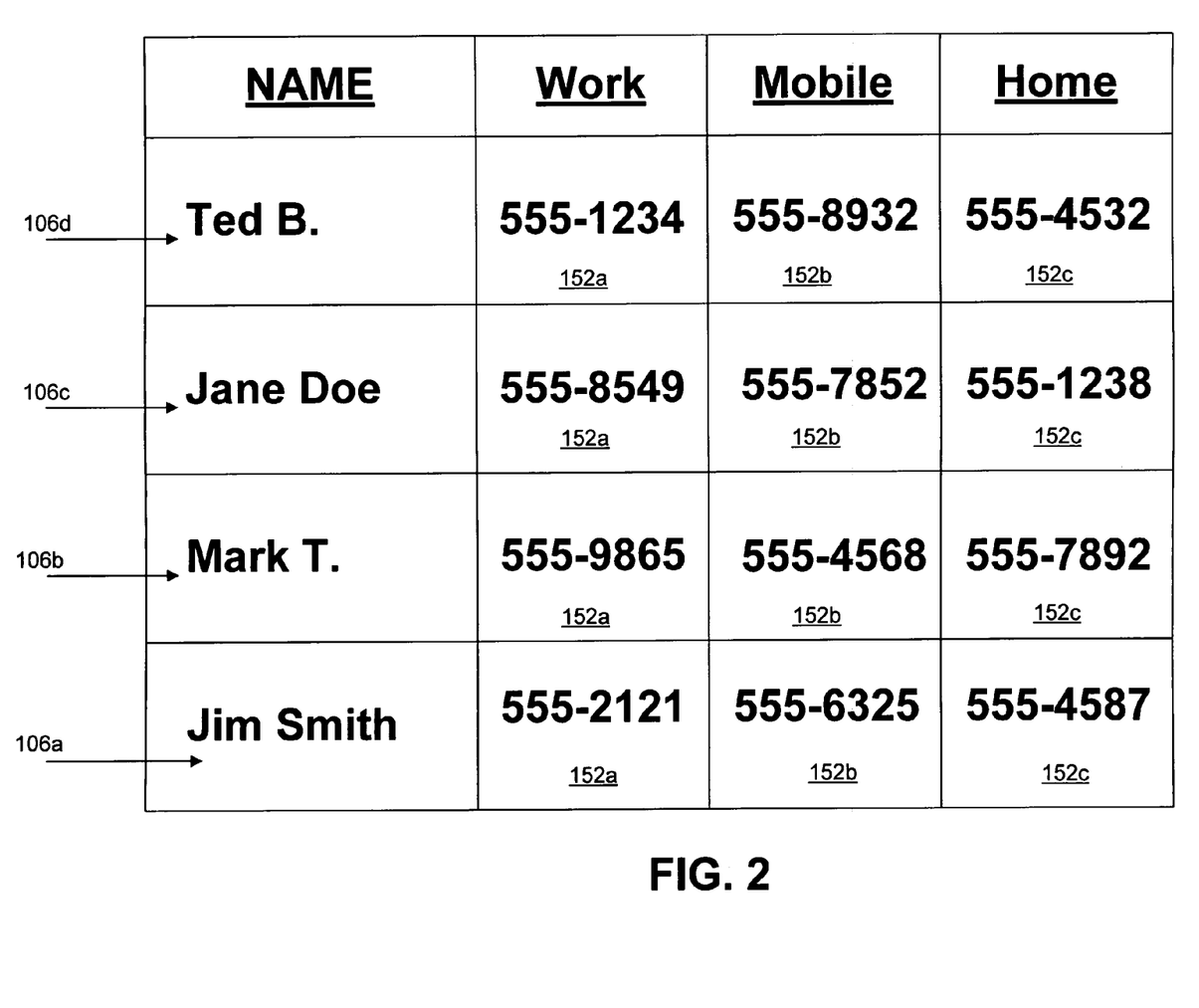
FIG. 2 is a phonebook spreadsheet illustrating a two-dimensional data set for an exemplary electronic phonebook, in accordance with an embodiment of the present invention.

FIGS. 1A and 1B were described in terms of the prior art. FIG. 2 is a phonebook spreadsheet 200 illustrating a two-dimensional data set for an exemplary electronic phonebook, in accordance with an embodiment of the present invention. Two-dimensional data, as used in the present description, refers to two data sets related to each other, such as in a spreadsheet or phonebook. For example, the phonebook spreadsheet includes a list of names entries 106a-106d. Each name entry 106a-106d has associated therewith a plurality of telephone number entries 152a-152c. In the example of FIG. 2, each name entry 106a-106d has associated therewith a work phone number entry 152a, a mobile phone number entry 152b, and a home phone number entry 152c.

As discussed previously, small screen devices such as cellular phones and PDAs have a limited amount of screen space to display information, generally in the range of about 108×96 pixels. Even when higher resolutions are utilized, the small size of the screen limits the information that can be displayed. Hence, conventionally when data was two-dimensional, such as the phonebook spreadsheet 200 described above, small screen device could not display both data sets on a single screen. As a result, two-dimensional data was split into two or more screens of data. Embodiments of the present invention address this issue by allowing the user to easily navigate both data sets on a single screen.

Figure 3:
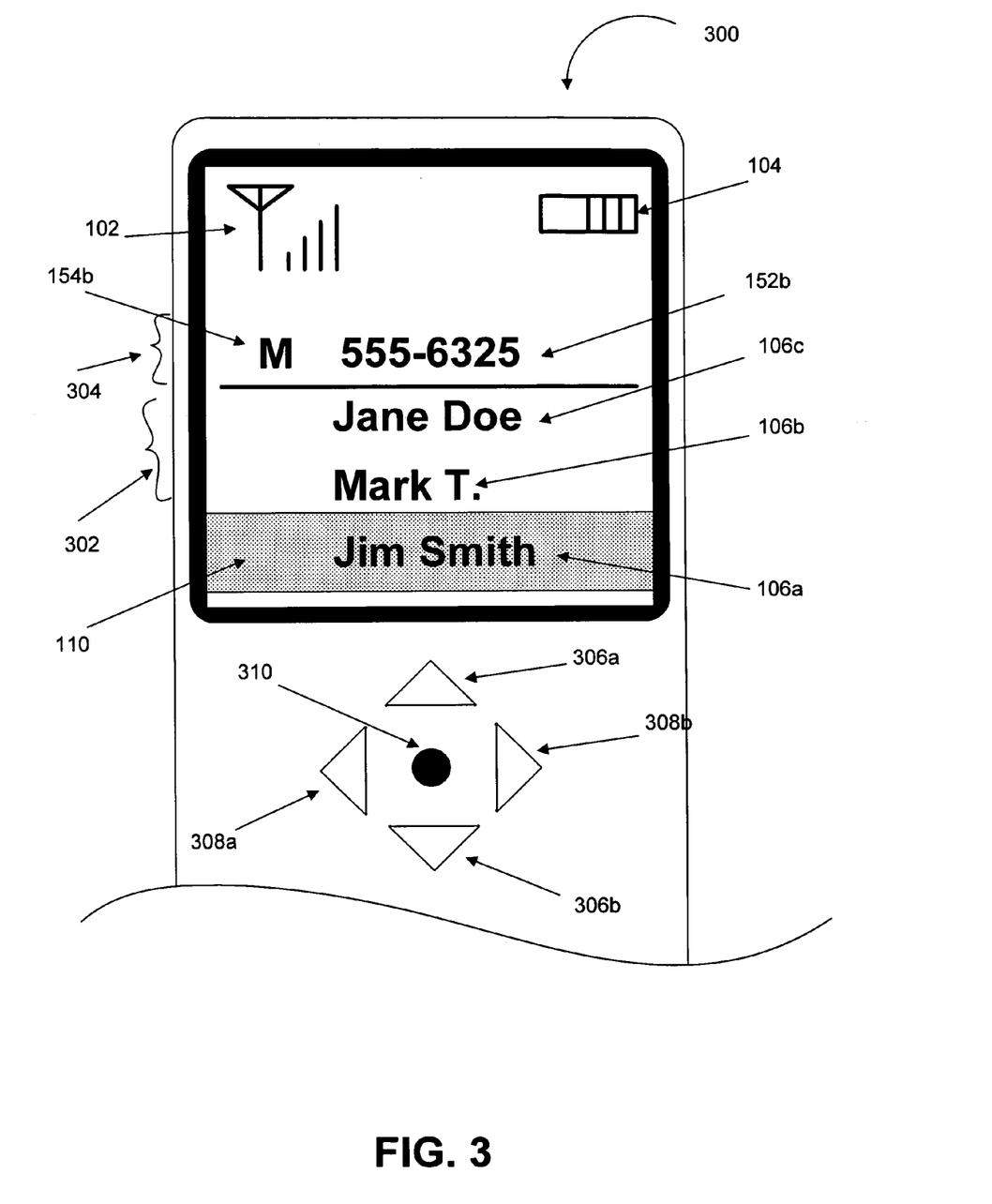
FIG. 3 is a diagram showing a phone having a small screen phonebook directory display, in accordance with an embodiment of the present invention.

FIG. 3 is a diagram showing a phone having a small screen phonebook directory display 300, in accordance with an embodiment of the present invention. The exemplary phonebook directory display 300 includes a signal strength indicator 102 and a battery power indicator 104 in addition to the phonebook data. As discussed previously, the signal strength indicator 102 informs the user as to the signal strength currently available at the user's current location, while the battery power indicator 104 informs the user as to the current power available in cellular phone's battery. The actual phonebook data is displayed in two sections, namely, a first data set display section 302 and a second data set display section 304. The first data set display section 302 includes a plurality of entries from the first data set, and second data set display section 304 includes one or more entries from the second data set.

In the example of FIG. 3, the first data set includes the name entries for the electronic phonebook. Hence, in this example, the first data set display section 302 includes a plurality of name entries 106a-106c and a selection indicator 110, which is utilized to select particular names from the plurality of name entries 106a-106c. The second data set includes the phone number entries related to the name entries in the electronic phonebook. Hence, in this example, the second data set display section 304 includes one or more phone number entries 152a-152c related to the selected name entry.

As mentioned above, a phonebook generally is ordered by names, with each name having a plurality of data associated with it, such as home phone numbers, work phone numbers, mobile phone numbers, and email addresses. However, also as mentioned above, small screen devices generally do not have the resolution and/or size required to display all the above information simultaneously. Hence, embodiments of the present invention display the data sets using the first data set display section 302 and a second data set display section 304.

In operation, the user browses through the list of name entries 106a-106d in the first data set display section 302 using the selection indicator 110. As the user moves from one entry in the first data set to the next using the selection indicator 110, one or more entries in the second data set related to the currently selected entry in the first data set are displayed in the second data set display section 304. For example, in FIG. 3, the user has moved the selection cursor 110 over the name entry 106a "Jim Smith" in the first data set display section 302. In response, a phone number related to the selected name entry "Jim Smith" is displayed in the second data set display section 304, in this example, the related mobile phone number entry 152b is displayed. As mentioned above, each phone number entry 152a-152c can also include a number type indicator, such as "W" for work 154a, "M" for mobile 154b, and "H" for home 154c.

Navigation is achieved using directional keys 306a-306b and 308a-308b, or a joystick 310, or both, depending on the control configuration of the particular phone utilizing the embodiments of the present invention. In one embodiment, the up and down directional keys 306a and 306b are utilized to navigate within the first data set display section 302. For example, when the up directional key 306a is pressed, the selection indicator 110 is moved up to the previous entry in the first data set, which is the name entries for the phonebook. Similarly, when the down directional key 306b is pressed, the selection indicator 110 is moved down to the subsequent entry in the first data set. It should be noted that the joystick 310 can be used in lieu of, or in addition to, the directional key commands. That is, the user can move the selection indicator 10 up to the previous entry in the first data set by moving the joystick 310 upward. Similarly, the user can move the joystick 310 downward to move the selection indicator 110 to the subsequent entry in the first data set.

To navigate through the second data set, the user utilizes the left and right directional keys 308a and 308b. As discussed above, the second data set includes the phone number entries related to the name entries in the electronic phonebook. Hence, in this example, the second data set display section 304 includes one or more phone number entries 152a-152c related to the selected name entry. Hence, similar to above, the left and right directional keys 308a and 308b are utilized to navigate within the second data set display section 302.

For example, when the left directional key 308a is pressed, the previous entry in the second data set is displayed, that is, the previous phone number for the selected name entry is displayed in the second data set display section 304. Similarly, the subsequent entry in the second data set is displayed when the right directional key 308b is pressed. That is, the subsequent phone number for the selected name entry is displayed in the second data set display section 304. As above, it should be noted that the joystick 310 can be used in lieu of, or in addition to, the directional key commands to navigate the second data set. Hence, the user can display the previous entry in the second data set by moving the joystick 310 to the left, and the subsequent entry in the second data set by moving the joystick to the right.

In the example of FIG. 3, the "mobile" phone number 154b for the selected name entry "Jim Smith" 106a is currently displayed. The user can display the "work" phone number 154a for the selected name entry "Jim Smith" 106a by pressing the left directional key 308a or by moving the joystick 310 to the left. Similarly, the user can display the "home" phone number 154c for the selected name entry "Jim Smith" 106a by pressing the right directional key 308b or by moving the joystick 310 to the right.

Although, specific operations have been given for particular key strokes and joystick movement in the above example, it should be noted that any key strokes or joystick commands can be used to navigate the data using the embodiments of the present invention. For example, the right and left directional keys 308a and 308b can be used to navigate through the name entries of the first data set, and the up and down directional keys 306a and 306b can be used to navigate through the phone number entries of the second data set. Similarly, the joystick 310 can be moved right and left to navigate through the name entries of the first data set, and the up and down directions of the joystick 310 can be used to navigate through the phone number entries of the second data set. Further, keys other than directional keys, such as number keys, '#' and '*' keys can be used to navigate through the first and second data sets, depending on the design of the particular small screen device and the needs of the developer and/or user. Other control examples can include, indicators on a touch screen that send navigation commands in response to a user's touch, and voice recognition software that sends navigation commands in response to a user's voice commands.

Figure 4:
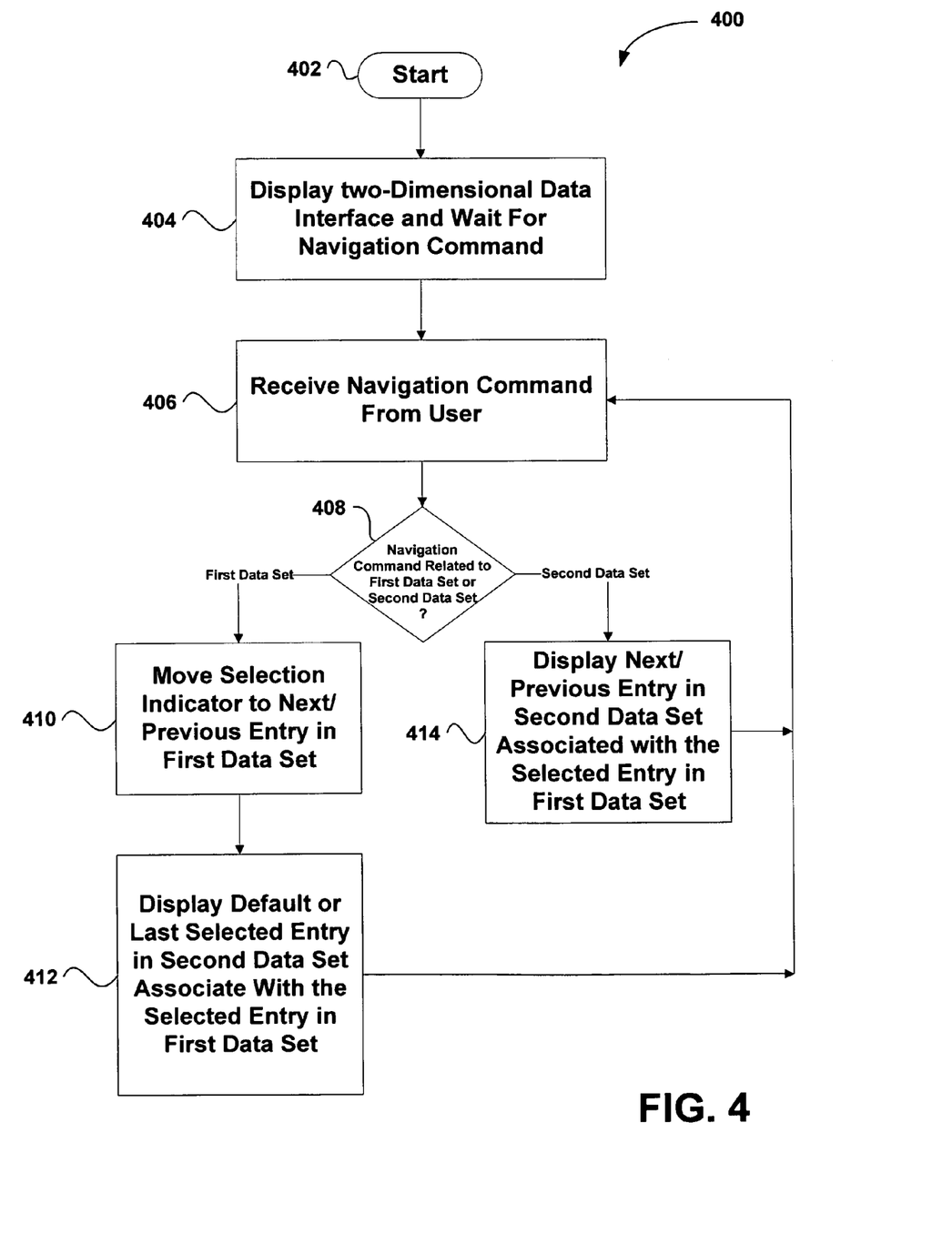
FIG. 4 is a flowchart showing a method for presenting two-dimensional data on a small screen device, in accordance with an embodiment of the present invention.

FIG. 4 is a flowchart showing a method 400 for presenting two-dimensional data on a small screen device, in accordance with an embodiment of the present invention. In an initial operation 402, setup operations can be performed. Setup operations can include entering data into a database for later use in the small screen device, internal system checks, and other setup operations that will be apparent to those skilled in the art after a careful reading of the present invention.

Figure 5A:
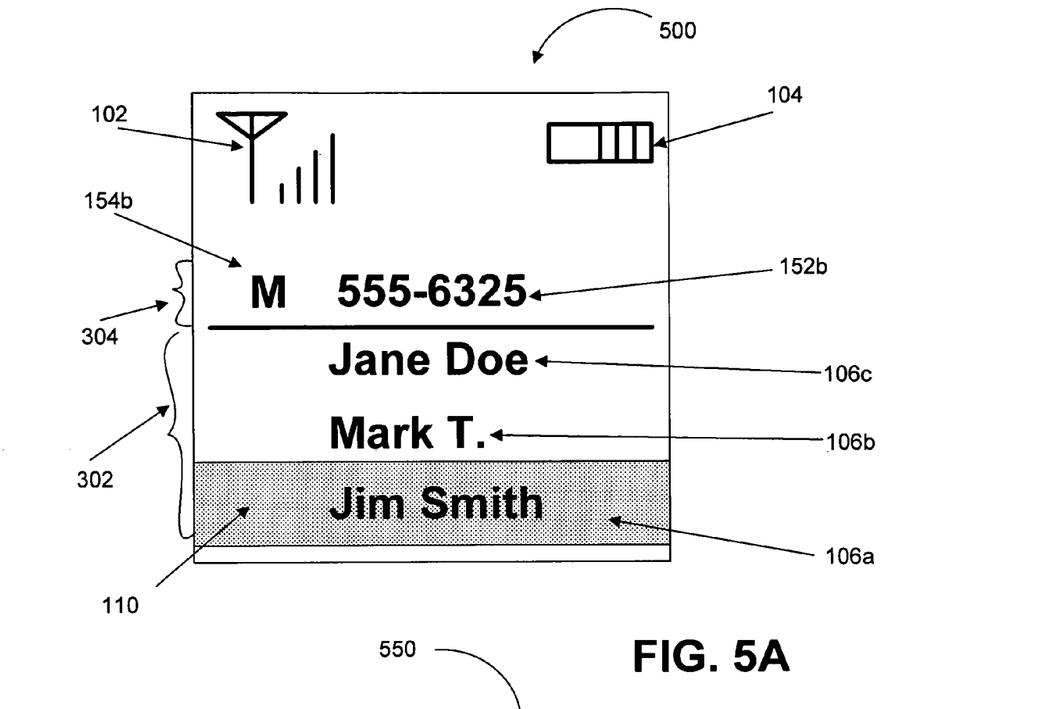
FIG. 5A is a diagram showing a small screen phonebook directory display, in accordance with an embodiment of the present invention.

In operation 404, a two-dimensional data interface is displayed and the system waits for the next user command. As mentioned above, embodiments of the present invention present two-dimensional data using a first data display section and a second data display section. FIG. 5A is a diagram showing a small screen phonebook directory display 500, in accordance with an embodiment of the present invention. The exemplary phonebook directory display 500 includes a signal strength indicator 102 and a battery power indicator 104 in addition to the phonebook data. As discussed previously, the signal strength indicator 102 informs the user as to the signal strength currently available at the user's current location, while the battery power indicator 104 informs the user as to the current power available in cellular phone's battery. The actual phonebook data is displayed in two sections, namely, a first data set display section 302 and a second data set display section 304.

The first data set display section 302 includes a plurality of entries from the first data set, and the second data set display section 304 includes one or more entries from the second data set. The first data set includes the name entries for the electronic phonebook. Hence, in this example, the first data set display section 302 includes a plurality of name entries 106a-106c and the selection indicator 110, which is utilized to select particular names from the plurality of name entries 106a-106c. The second data set includes the phone number entries related to the name entries in the electronic phonebook. Hence, in this example, the second data set display section 304 includes one or more phone number entries 152a-152c related to the selected name entry.

Referring back to FIG. 4, a navigation command is received from the user in operation 406. As discussed previously, one embodiment of the present invention uses directional keys and/or a joystick for navigation. For example, up and down directional keys or up and down joystick movement sends a navigation command related to the first data set. Right and Left directional keys or Right and Left joystick movement sends a navigation command related to the second data set. As previously mentioned, these commands are for exemplary purposes only, that is, any keys, key combinations, or other controls can be used for data navigation, as needed by the small screen device or user.

A decision is then made as to whether the received navigation command is related to the first data set or the second data set, in operation 408. If the received navigation command is related to the first data set, the method 400 continues with operation 410. However, if the received navigation command is related to the second data set, the method 400 continues with operation 414.

In operation 410, the selection indicator is moved to the next or previous entry in the first data set, depending on the nature of the navigation command. As mentioned above, in one embodiment the up and down directional keys or up and down joystick movement sends a navigation command related to the first data set to the system. For example, when the up directional key is pressed, the selection indicator is moved up to the previous entry in the first data set. Similarly, when the down directional key is pressed, the selection indicator is moved down to the subsequent entry in the first data set. The user also can move the selection indicator up to the previous entry in the first data set by moving the joystick upward, or to the subsequent entry in the first data set by moving the joystick downward, as illustrated in FIG. 5B.

Figure 5B:
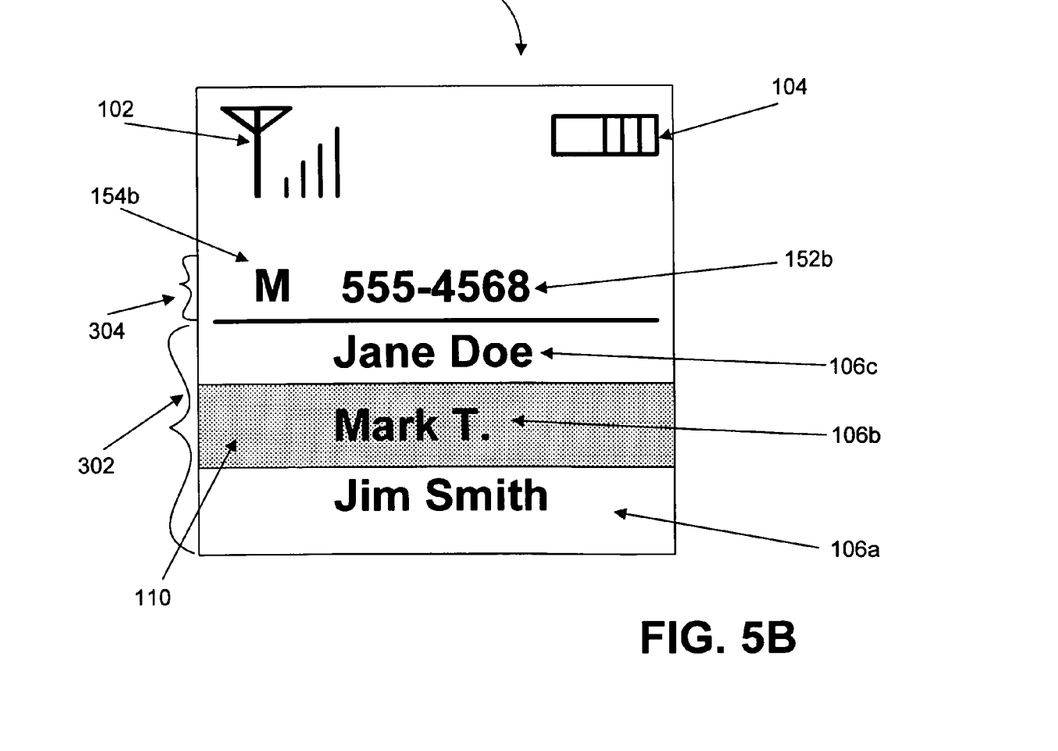
FIG. 5B is a diagram showing a small screen phonebook directory display after receiving a navigation command related to the first data set, in accordance with an embodiment of the present invention.

FIG. 5B is a diagram showing a small screen phonebook directory display 550 after receiving a navigation command related to the first data set, in accordance with an embodiment of the present invention. In the example of FIG. 5B, the user has pressed the up directional key, or moved the joystick in an upward direction. As a result, the selection indicator 110 is moved from the current name entry "Jim Smith" 106a to the previous name entry "Mark T." 106b.

Referring back to FIG. 4, in operation 412, the default or last selected entry in the second data set that is associated with the selected entry in the first data set is displayed. With each new first data set entry selection, embodiments of the present invention can display a default related entry in the second data set. In some embodiments, the last entry in the second data set related to the selected first data set entry is displayed with each new first data set entry selection. In addition, both of these criteria can be used. That is, when a user has previously selected a second data set entry related to the first data set, that second data set entry is displayed. If the user has not previously selected an entry in the second data set related to the selected first data set entry, a default entry in the second data set is displayed.

For example, referring to FIG. 5B, the last selected second data set entry, or the default entry, for the currently selected name entry "Mark T." 106b is the related "mobile" phone number 152b. Hence, when the user selects the name entry "Mark T." 106b, the "mobile" phone number 152b is displayed in the second data set display section 304. Referring back to FIG. 4, after displaying the second data set entry in operation 412, the system is ready for another navigation command, which is received in a subsequent operation 406.

When the navigation command is related to the second data set, the method 400 branches to operation 414. In operation 414, the next or previous entry in the second data set, depending on the nature of the navigation command, related to the selected entry in the first data set is displayed. As mentioned above, in one embodiment the left and right directional keys or left and right joystick movement sends a navigation command related to the second data set to the system. For example, when the left directional key is pressed, the previous entry in the second data set is displayed. Similarly, when the right directional key is pressed, the subsequent entry in the second data set is displayed. The user also can display the previous entry in the second data set by moving the joystick to the left, or to the subsequent entry in the second data set by moving the joystick to the right, as illustrated in FIG. 6A.

Figure 6A:
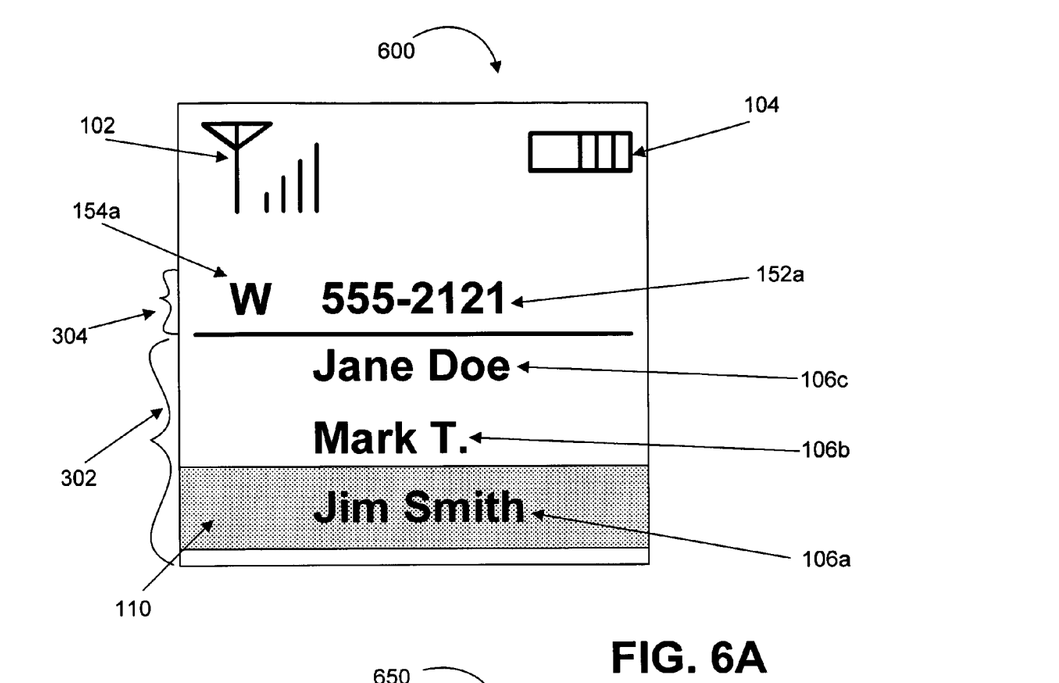
FIG. 6A is a diagram showing a small screen phonebook directory display after receiving a navigation command to display the previous data entry in the related second data set, in accordance with an embodiment of the present invention.

FIG. 6A is a diagram showing a small screen phonebook directory display 600 after receiving a navigation command to display the previous data entry in the related second data set, in accordance with an embodiment of the present invention. In FIG. 5A, the "mobile" phone number 152b for the first data set entry "Jim Smith" 106a is currently displayed. FIG. 6A illustrates the result of receiving a navigation command to display the previous data entry in the related second data set. That is, in the example of FIG. 6A, the user has pressed the left directional key, or moved the joystick to the left. As a result, the previous entry in the second data set related to the selected name entry "Jim Smith" 106a is displayed. That is, the "work" phone number entry 152a for the selected name entry "Jim Smith" 106a is displayed.

Figure 6B:
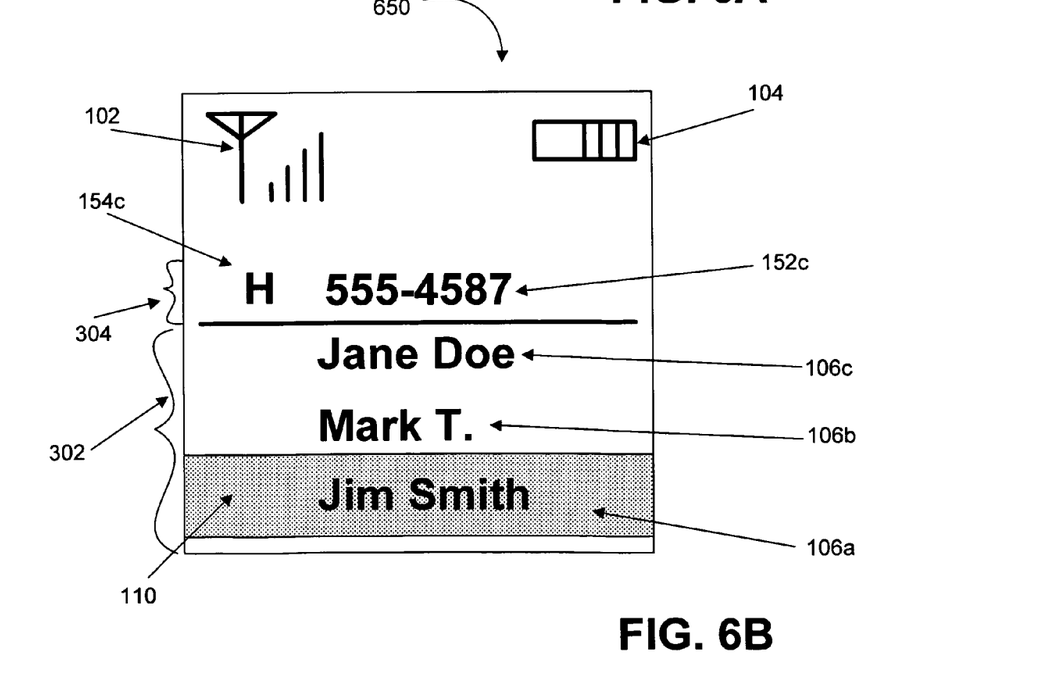
FIG. 6B is a diagram showing a small screen phonebook directory display after receiving a navigation command to display the next data entry in the related second data set, in accordance with an embodiment of the present invention.

Referring back to FIG. 5A, the "mobile" phone number 152b for the first data set entry "Jim Smith" 106a is currently displayed. FIG. 6B is a diagram showing a small screen phonebook directory display 600 after receiving a navigation command to display the next data entry in the related second data set, in accordance with an embodiment of the present invention. In the example of FIG. 6B, the user has pressed the right directional key, or moved the joystick to the right. As a result, the next entry in the second data set related to the selected name entry "Jim Smith" 106a is displayed. That is, the "home" phone number entry 152a for the selected name entry "Jim Smith" 106a is displayed. Referring back to FIG. 4, after displaying the second data set entry in operation 414, the system is ready for another navigation command, which is received in a subsequent operation 406.

Figure 7:
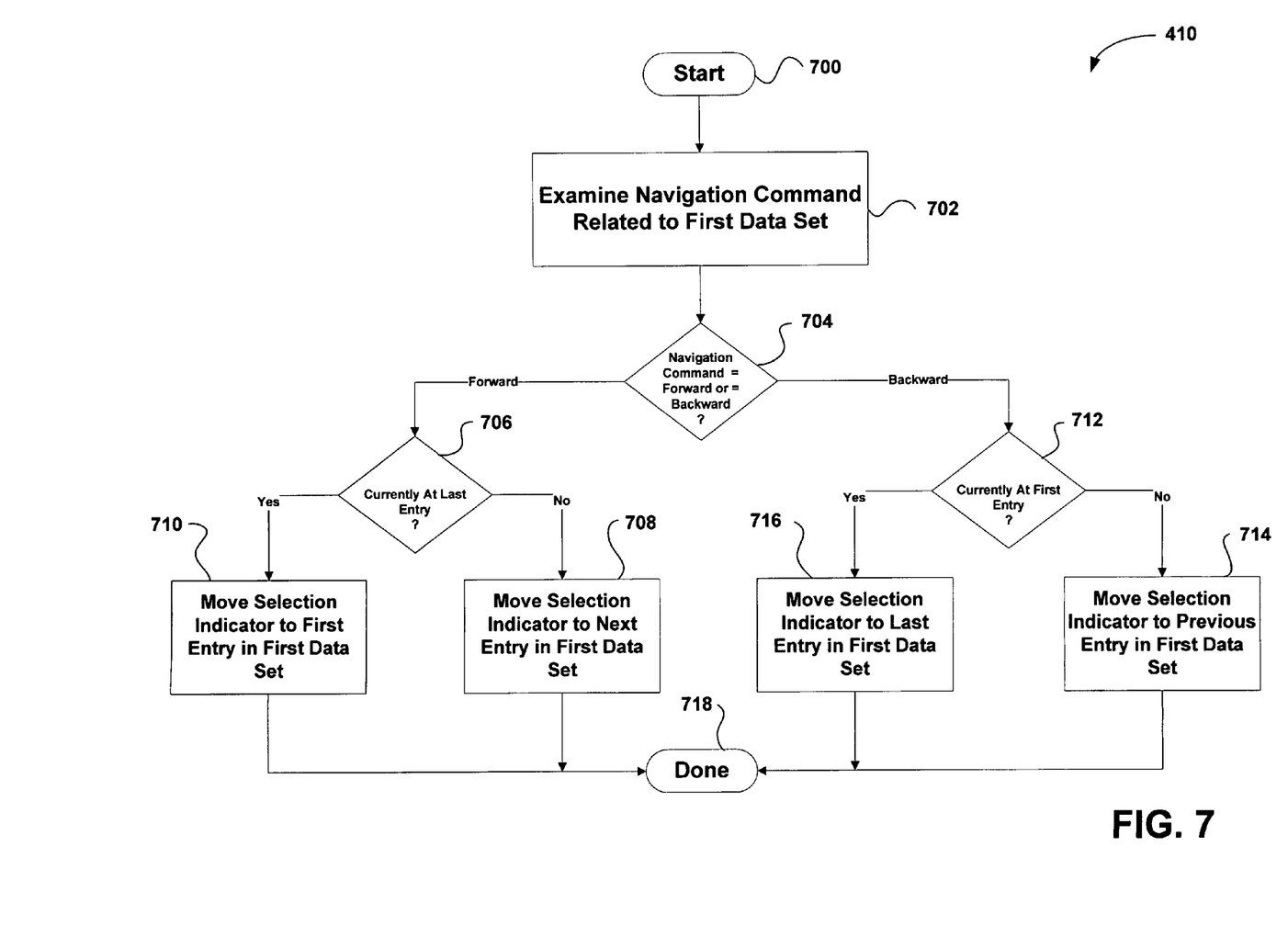
FIG. 7 is flowchart showing a method for navigating in the first data set, in accordance with an embodiment of the present invention.

FIG. 7 is flowchart showing a method 410 for navigating in the first data set, in accordance with an embodiment of the present invention. In an initial operation 700, preprocess operations are performed. Preprocess operations can include displaying the two-dimensional interface, receiving a navigation command related to the first data set, and other preprocess operations that will be apparent to those skilled in the art after a careful reading of the present disclosure.

In operation 702, the received navigation command is examined to determine which entry in the first data set to select. As noted above, one embodiment of the present invention utilizes the up and down directional keys or up and down joystick movement to send navigation commands related to the first data set to the system. For example, the down directional key can indicate a "forward" command to select the next entry in the first data set. Similarly, the up directional key can indicate a "backward" command to select the previous entry in the first data set. The user also can indicate a "forward" command to select the next entry in the first data set by moving the joystick in a downward direction, or a "backward" command to select the previous entry in the first data set by moving the joystick in an upward direction.

A decision is then made as to whether the navigation command is a "forward" command or a "backward" command, in operation 704. If the navigation command is a "forward" command, the method 410 branches to operation 706. However, if the navigation command is a "backward" command, the method 410 branches to operation 712.

When a "forward" navigation command is received, a decision is made as to whether the currently selected entry in the first data set is the last entry in the first data set, in operation 706. If the currently selected entry in the first data set is the last entry in the first data set, the method 410 branches to operation 710. Otherwise, the method 410 branches to operation 708.

In operation 708, the selection indicator is moved to the next entry in the first data set. For example, referring to FIG. 2, if the selection indicator is currently at the "Jane Doe" name entry 106c when a "forward" navigation command is received, the selection indicator is moved to the next name entry, which is the "Mark T." name entry 106b. In this manner, the user is allowed to browse through the first data set using the "forward" navigation command.

However, if the currently selected entry in the first data set is at the last entry in the first data set, the selection indicator is moved to the first entry in the first data set, in operation 710. In one embodiment, when the currently selected entry in the first data set is the last entry in the first data set and a "forward" navigation command is received, the selection indicator is "looped" back to the beginning of the first data set. However, it should be noted that operation 710 only illustrates an example of operations that can be performed when the end of the data set is reached and an additional "forward" command is received. For example, another operation that can be performed in operation 710 is to ignore all "forward" navigation commands received when currently at the end of the first data set. In this manner, the selection indicator remains at the currently selected name entry when a "forward" navigation command is received when currently at the end of the first data set.

When a "backward" navigation command is received, a decision is made as to whether the currently selected entry in the first data set is the first entry in the first data set, in operation 712. If the currently selected entry in the first data set is the first entry in the first data set, the method 410 branches to operation 716. Otherwise, the method 410 branches to operation 714.

In operation 714, the selection indicator is moved to the next previous in the first data set. For example, referring to FIG. 2, if the selection indicator is currently at the "Jane Doe" name entry 106c when a "backward" navigation command is received, the selection indicator is moved to the previous name entry, which is the "Ted B." name entry 106d. In this manner, the user is allowed to browse through the first data set using the "backward" navigation command.

However, if the currently selected entry in the first data set is at the first entry in the first data set, the selection indicator is moved to the last entry in the first data set, in operation 716. In one embodiment, when the currently selected entry in the first data set is the first entry in the first data set and a "backward" navigation command is received, the selection indicator is "looped" to the end of the first data set. However, it should be noted that operation 716 only illustrates an example of operations that can be performed when the end of the data set is reached and an additional "backward" command is received. For example, another operation that can be performed in operation 716 is to ignore all "backward" navigation commands received when currently at the beginning of the first data set. In this manner, the selection indicator remains at the currently selected name entry when a "backward" navigation command is received when currently at the beginning of the first data set.

Post process operations are performed in operation 718. Post process operations can include, for example, displaying an entry in the second data set related to a newly selected entry in the first data set, receiving additional navigation commands, and other post process operations that will be apparent to those skilled in the art after a careful reading of the present disclosure.

Figure 8:
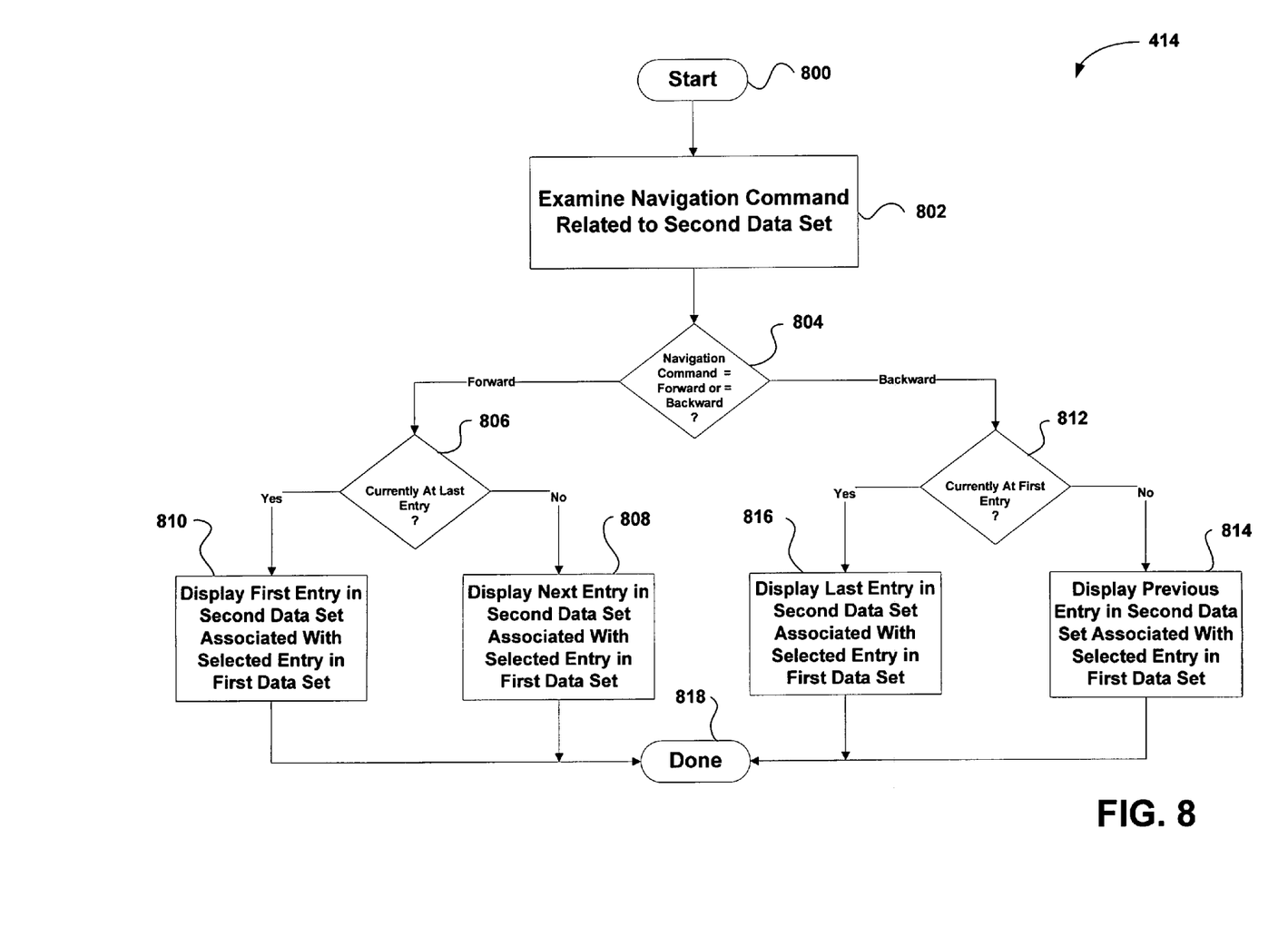
FIG. 8 is flowchart showing a method for navigating in the second data set, in accordance with an embodiment of the present invention.

FIG. 8 is flowchart showing a method 414 for navigating in the second data set, in accordance with an embodiment of the present invention. In an initial operation 800, preprocess operations are performed. Preprocess operations can include displaying the two-dimensional interface, receiving a navigation command related to the second data set, and other preprocess operations that will be apparent to those skilled in the art after a careful reading of the present disclosure.

In operation 802, the received navigation command is examined to determine which entry in the second data set to select. As noted above, one embodiment of the present invention utilizes the left and right directional keys or left and right joystick movement to send navigation commands related to the second data set to the system. For example, the right directional key can indicate a "forward" command to select the next entry in the second data set. Similarly, the left directional key can indicate a "backward" command to select the previous entry in the second data set. The user also can indicate a "forward" command to select the next entry in the second data set by moving the joystick to the right, or a "backward" command to select the previous entry in the first data set by moving the joystick to the left.

A decision is made as to whether the navigation command is a "forward" command or a "backward" command, in operation 804. If the navigation command is a "forward" command, the method 414 branches to operation 806. However, if the navigation command is a "backward" command, the method 414 branches to operation 812.

When a "forward" navigation command is received, a decision is made as to whether the currently selected entry in the second data set is the last entry in the second data set associated with the currently selected entry in the first data set, in operation 806. If the currently selected entry in the second data set is the last entry in the second data set associated with the currently selected entry in the first data set, the method 414 branches to operation 810. Otherwise, the method 414 branches to operation 808.

In operation 808, the next entry in the second data set associated with the selected entry in the first data set is displayed in the second data set display section. For example, referring to FIG. 2, if the "mobile 555-6325" phone number 152b for the "Jim Smith" name entry 106a is currently displayed when a "forward" navigation command is received for the second data set, the "home 555-4587" phone number 152c for the "Jim Smith" name entry 106a will be displayed. That is, the currently selected first data set entry is the "Jim Smith" name entry 106a. Hence, the next entry in the second data set associated with the "Jim Smith" name entry 106a is the "home 555-4587" phone number entry 152c. In this manner, the user is allowed to browse through the second data set using the "forward" navigation command.

However, if the currently displayed entry in the second data set is at the last entry in the second data set associated with the selected entry in the first data set, the first entry in the second data set associated with the selected entry in the first data set is displayed in the second data set display section, in operation 810. In one embodiment, when the currently displayed entry in the second data set is the last entry in the second data set associated with the selected entry in the first data set and a "forward" navigation command is received for the second data set, the display "loops" back to the beginning of the second data set associated with the selected entry in the first data set. However, it should be noted that operation 810 only illustrates an example of operations that can be performed when the end of the second data set is reached and an additional "forward" command is received. For example, another operation that can be performed in operation 810 is to ignore all "forward" navigation commands for the second data set received when currently at the end of the second data set associated with the selected entry in the first data set. In this manner, the currently display phone number remains displayed when a "forward" navigation command is received when currently at the end of the second data set associated with the selected entry in the first data set.

When a "backward" navigation command is received, a decision is made as to whether the currently selected entry in the second data set is the first entry in the second data set associated with the currently selected entry in the first data set, in operation 812. If the currently selected entry in the second data set is the first entry in the second data set associated with the currently selected entry in the first data set, the method 414 branches to operation 816. Otherwise, the method 414 branches to operation 814.

In operation 814, the previous entry in the second data set associated with the selected entry in the first data set is displayed in the second data set display section. For example, referring to FIG. 2, if the "mobile 555-6325" phone number 152b for the "Jim Smith" name entry 106a is currently displayed when a "backward" navigation command is received for the second data set, the "work 555-2121" phone number 152a for the "Jim Smith" name entry 106a will be displayed. That is, the currently selected first data set entry is the "Jim Smith" name entry 106a. Hence, the previous entry in the second data set associated with the "Jim Smith" name entry 106a is the "work 555-2121" phone number entry 152a. In this manner, the user is allowed to browse through the second data set using the "backward" navigation command.

However, if the currently displayed entry in the second data set is at the first entry in the second data set associated with the selected entry in the first data set, the last entry in the second data set associated with the selected entry in the first data set is displayed in the second data set display section, in operation 816. In one embodiment, when the currently displayed entry in the second data set is the first entry in the second data set associated with the selected entry in the first data set and a "backward" navigation command is received for the second data set, the display "loops" to the end of the second data set associated with the selected entry in the first data set. However, it should be noted that operation 816 only illustrates an example of operations that can be performed when the beginning of the second data set is reached and an additional "backward" command is received. For example, another operation that can be performed in operation 816 is to ignore all "backward" navigation commands for the second data set received when currently at the beginning of the second data set associated with the selected entry in the first data set. In this manner, the currently display phone number remains displayed when a "backward" navigation command is received when currently at the beginning of the second data set associated with the selected entry in the first data set.

Post process operations are performed in operation 818. Post process operations can include, for example, receiving additional navigation commands, and other post process operations that will be apparent to those skilled in the art after a careful reading of the present disclosure.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for displaying two-dimensional data on small screen devices, comprising the operations of:

providing a first data set display section on a screen, the first data set display section capable of presenting a list of entries in a first data set, the first data set being arranged in a first dimension of the two-dimensional data;

providing a second data set display section on the screen, the second data set display section capable of presenting only one of a particular entry from a second data set associated with a selected entry from the first data set, the second data set being arranged in a second dimension of the two-dimensional data, and wherein the second data set display section on the screen being separate from each of the entries in the first data set and presenting of the particular entry from the second data set does not graphically affect the list of entries in the first data set that are displayed at the same time the particular entry of the second data set is displayed, in the second data set display section; and presenting only one of a new entry from the second data set in the second data set display section in response to receiving a navigation command related to the second data set and the navigation command being in the second dimension of the two-dimensional data, the new entry being associated with the selected entry from the first data set.

2. A method as recited in claim 1, further comprising the operation of providing a selection indicator in the first data set display section, the selection indicator indicating the selected entry from the first data set.

3. A method as recited in claim 2, further comprising the operation of moving the selection indicator among entries in the first data set in response to receiving a navigation command related to the first data set.

4. A method as recited in claim 1, wherein left and right directional keys provide navigation commands related to the second data set, and wherein up and down directional keys provide navigation commands related to the first data set.

5. A method as recited in claim 1, wherein left and right joystick movement provides navigation commands related to the second data set, and wherein up and down joystick movement provides navigation commands related to the first data set.

6. A method as recited in claim 1, wherein the first data set comprises a plurality of name entries for an electronic phonebook.

7. A method as recited in claim 6, wherein the second data set comprises a plurality of phone numbers related to the name entries of the first data set.

8. A method as recited in claim 7, wherein the second data set further comprises a plurality of email addresses related to the name entries of the first data set.

9. A small screen device capable of displaying two-dimensional data on small screen devices, comprising:

a screen having a first data set display section and a second data set display section that is separate from the first data set display section, wherein the first data set display section is capable of presenting a list of entries in a first data set, and wherein the second data set display section is capable of presenting a single one of a particular entry from a second data set associated with a selected entry from the first data set, and presenting the particular entry from the second data set does not graphically affect the list of entries in the first data set; and navigation controls capable of providing navigation commands, wherein a single one of a new entry from the second data set is presented in the second data set display section in response to receiving a navigation command related to the second data set, the new entry being associated with the selected entry from the first data set.

10. A small screen device as recited in claim 9, further comprising a selection indicator positioned in the first data set display section, the selection indicator indicating the selected entry from the first data set.

11. A small screen device as recited in claim 10, wherein the selection indicator is moved among entries in the first data set in response to receiving a navigation command related to the first data set.

12. A small screen device as recited in claim 9, wherein the navigation controls include left and right directional keys that provide navigation commands related to the second data set, and up and down directional keys that provide navigation commands related to the first data set.

13. A small screen device as recited in claim 9, wherein the navigation controls include a joystick, wherein left and right joystick movements provide navigation commands related to the second data set, and wherein up and down joystick movements provide navigation commands related to the first data set.

14. A computer program embodied on a computer readable medium for causing a computer system to perform a method for displaying two-dimensional data on small screen devices, the method comprising:

providing a first data set display section on a screen, the first data set display section capable of presenting a list of entries in a first data set, the first data set being arranged in a first dimension of the two-dimensional data;

providing a second data set display section on the screen, the second data set display section capable of presenting only one of a particular entry from a second data set associated with a selected entry from the first data set, the second data set being arranged in a second dimension of the two-dimensional data, and wherein the second data set display section on the screen being separate from each of the entries in the first data set and presenting of the particular entry from the second data set does not graphically affect the list of entries in the first data set that are displayed at the same time the particular entry of the second data set is displayed, in the second data set display section; and providing only one of a new entry from the second data set in the second data set display section in response to receiving a navigation command related to the second data set and the navigation command being in the second dimension of the two-dimensional data, the new entry being associated with the selected entry from the first data set.

15. A computer program as recited in claim 14, further comprising providing a selection indicator in the first data set display section, the selection indicator indicating the selected entry from the first data set.

16. A computer program as recited in claim 15, further including moving the selection indicator among entries in the first data set in response to receiving a navigation command related to the first data set.

17. A computer program as recited in claim 16, wherein left and right directional keys provide navigation commands related to the second data set, and wherein up and down directional keys provide navigation commands related to the first data set.

18. A computer program as recited in claim 16, wherein left and right joystick movements provide navigation commands related to the second data set, and wherein up and down joystick movements provide navigation commands related to the first data set.

19. A computer program as recited in claim 16, wherein the first data set comprises a plurality of name entries for an electronic phonebook.

20. A computer program as recited in claim 19, wherein the second data set comprises a plurality of phone numbers and email addresses related to the name entries of the first data set.

* * * * *